(12) United States Patent
Nagano

(10) Patent No.: US 7,286,618 B2
(45) Date of Patent: Oct. 23, 2007

(54) DIGITAL AGC CIRCUIT

(75) Inventor: Kouichi Nagano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 747 days.

(21) Appl. No.: 10/630,811

(22) Filed: Jul. 31, 2003

(65) Prior Publication Data

US 2004/0141571 A1 Jul. 22, 2004

(30) Foreign Application Priority Data

Jan. 22, 2003 (JP) ............................. 2003-013847

(51) Int. Cl.
*H04L 27/08* (2006.01)
(52) U.S. Cl. ..................... 375/345; 455/234.1
(58) Field of Classification Search ............. 375/345; 455/139, 136, 234.1
See application file for complete search history.

(56) References Cited

U.S. PATENT DOCUMENTS

| | | | |
|---|---|---|---|
| 5,620,466 A * | 4/1997 | Haefner et al. ............ | 607/5 |
| 5,719,867 A * | 2/1998 | Borazjani ................ | 370/436 |
| 5,940,451 A * | 8/1999 | Kim ..................... | 375/345 |
| 6,029,056 A * | 2/2000 | Kiyanagi et al. ......... | 455/276.1 |
| 7,046,800 B1 * | 5/2006 | Tenca et al. ............ | 380/28 |
| 2003/0058764 A1 * | 3/2003 | Ueno .................... | 369/47.27 |

FOREIGN PATENT DOCUMENTS

| | | |
|---|---|---|
| JP | 60-20611 A | 2/1985 |
| JP | 63-026008 | 2/1988 |
| JP | 01-146413 | 6/1989 |
| JP | 01-200709 | 8/1989 |
| JP | 06-334459 | 12/1994 |
| JP | 8-335957 | 12/1996 |
| JP | 10-302398 | 11/1998 |
| JP | 2001-126413 | 5/2001 |

* cited by examiner

*Primary Examiner*—Jean B. Corrielus
(74) *Attorney, Agent, or Firm*—McDermott Will & Emery LLP

(57) ABSTRACT

To perform gain adjustment of the amplitude of a binary phase shift keying (BPSK) wobble signal from a DVD to enable high-precision demodulation of address information, a peak detection circuit detects a peak value in a time period equal to or more than a half period of the input wobble signal. A gain computation circuit computes a gain adjustment coefficient from the peak value. The gain adjustment coefficient is limited to within a fixed range by a limiter and then supplied to a multiplier. To adjust digital-related delay generated when the gain adjustment coefficient is computed, the input wobble signal is delayed by a delay circuit before being supplied to the multiplier. The multiplier multiplies the wobble signal from the delay circuit by the gain adjustment coefficient and outputs the result as the digital AGC output.

19 Claims, 7 Drawing Sheets

32T

DIGITAL AGC CIRCUIT

BACKGROUND OF THE INVENTION

The present invention relates to a digital automatic gain control (AGC) circuit technology used for an address information demodulation circuit for demodulating address information recorded on a DVD (digital versatile disk) by phase modulation of a wobble signal.

On recordable DVD+Rs, rewritable DVD+RWs and the like among DVDs of various standards, address information is recorded in advance by an address in pre-groove (ADIP) method in which address information is embedded in a wobble formed by meandering a groove in a sine-wave shape. By detecting the wobble signal, high-precision address detection is attained.

The wobble signal from a DVD is binary phase-modulated by binary phase shift keying (BPSK). In an address information demodulation circuit, a technology of correcting a phase change (delay) caused by a band pass filter (BPF) of a carrier generation circuit is known (Japanese Laid-Open Patent Publication No. 2001-126413).

A technology of digitizing an AGC circuit for demodulation of BPSK is also known. In this technology, an input BPSK signal is converted to digital signals by sampling the BPSK signal at positions different in phase by a quarter period from each other. Peak-to-peak values of the signals are compared with each other, and a gain for the input BPSK signal is computed from a larger peak-to-peak value, and fed back to thereby control the peak-to-peak value of the input BPSK signal at a predetermined value (see Japanese Laid-Open Patent Publication No. 8-335957).

The wobble signal received from a DVD varies in amplitude in many cases. Therefore, conventionally, a problem arises that such amplitude variation still remains even after gain adjustment with a large time constant is performed in an analog circuit.

SUMMARY OF THE INVENTION

An object of the present invention is providing a digital AGC circuit that performs gain adjustment of the amplitude of a wobble signal from a DVD to enable high-precision demodulation of address information.

To attain the above object, the first digital AGC circuit of the present invention is a digital AGC circuit adopting feedforward control, used for an address information demodulation circuit for demodulating address information recorded on a DVD by phase modulation of a wobble signal. The digital AGC circuit includes: a peak detection circuit for receiving a digitized wobble signal and detecting a peak value in a time period equal to or more than a half period of the wobble signal; a gain computation circuit for computing a gain adjustment coefficient from the detected peak value; and a multiplier for multiplying the digitized wobble signal by the gain adjustment coefficient.

The second digital AGC circuit of the present invention is a digital AGC circuit adopting feedback control, used for an address information demodulation circuit for demodulating address information recorded on a DVD by phase modulation of a wobble signal. The digital AGC circuit includes: a peak detection circuit for receiving an output of the digital AGC circuit and detecting a peak value in a time period equal to or more than a half period of the input; a gain computation circuit for computing a gain adjustment coefficient from the detected peak value; and a multiplier for receiving a digitized wobble signal and multiplying the wobble signal by the gain adjustment coefficient.

According to the present invention, the digital AGC circuit adopts feedforward or feedback control using a peak value in a time period equal to or more than a half period of the wobble signal. Therefore, high precision demodulation of address information is possible.

DESCRIPTION OF THE PREFERRED EMBODIMENTS

Hereinafter, preferred embodiments of the present invention will be described with reference to the accompanying drawings.

Figure 1:
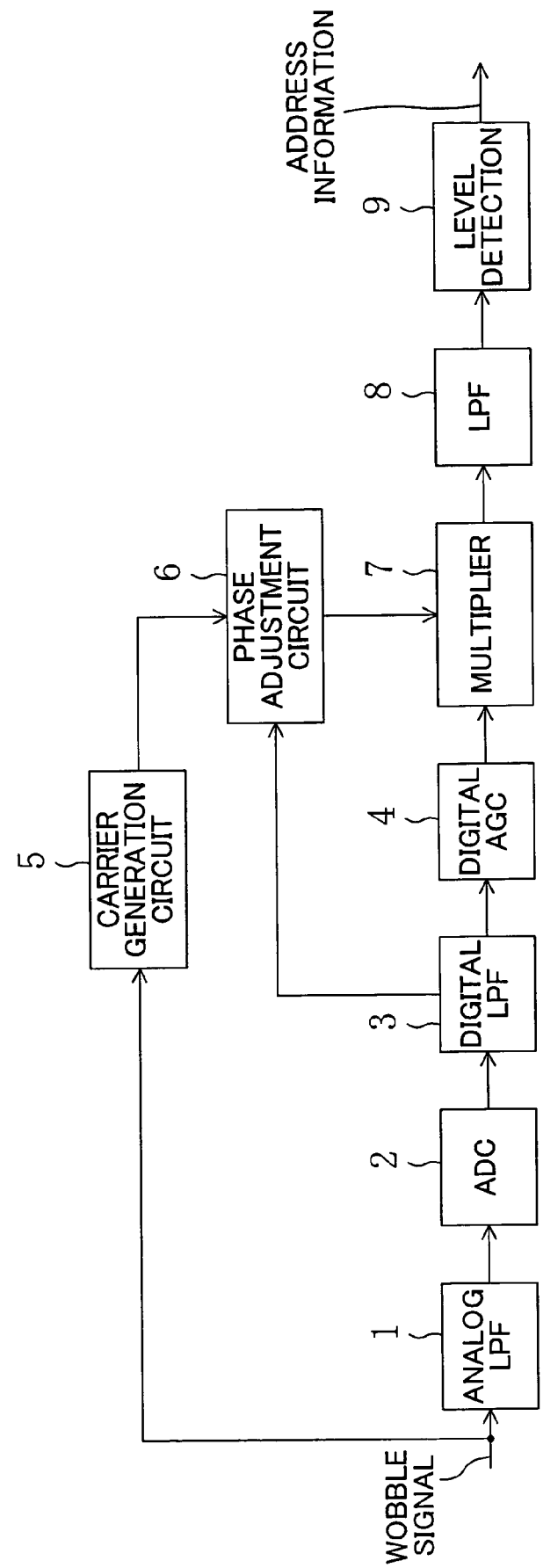
FIG. 1 is a block diagram of an address information demodulation circuit for DVD including a digital AGC circuit of the present invention.

FIG. 1 shows a configuration of an address information demodulation circuit for DVD. Referring to FIG. 1, the address information demodulation circuit includes an analog low pass filter (LPF) 1, an analog-to-digital converter (ADC) 2, a digital LPF 3, a digital AGC circuit 4 of the present invention, a carrier generation circuit 5, a phase adjustment circuit 6, a multiplier 7, an LPF 8 and a level detection circuit 9.

In the address information demodulation circuit of FIG. 1, the analog LPF 1 removes high-frequency noise from an input wobble signal, and the ADC 2 converts the resultant wobble signal to a digital signal. The digital LPF 3 further removes noise during passing of the digital signal therethrough. The digital AGC circuit 4 adjusts the gain so as to correct a variation in the amplitude of the output of the digital LPF 3 and keep the amplitude constant. The carrier generation circuit 5 generates a carrier from the input wobble signal, and the phase adjustment circuit 6 adjusts the phase of the carrier. The multiplier 7 multiplies the output of the phase adjustment circuit 6 by the output of the digital AGC circuit 4. The output of the multiplier 7 is smoothed by the LPF 8, to obtain address information via the level detection circuit 9.

Figure 2:
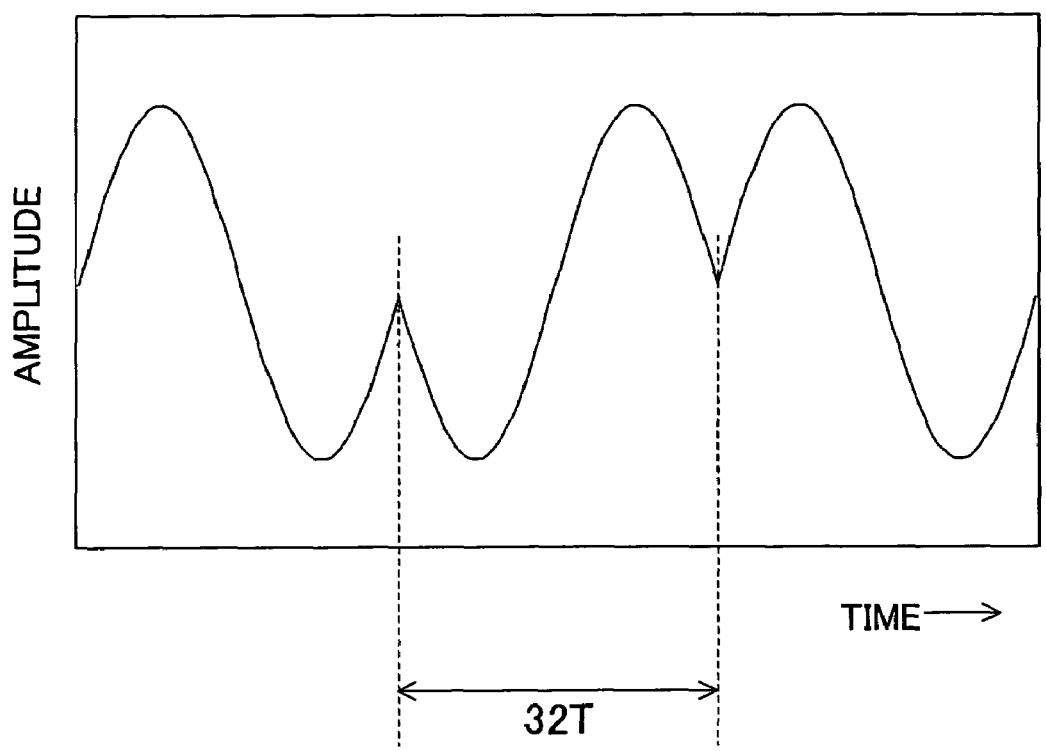
FIG. 2 is a phase-modulated waveform of an input wobble signal in the address information demodulation circuit of FIG. 1.

FIG. 2 shows a phase-modulated waveform of the input wobble signal in the address information demodulation circuit of FIG. 1. When one period of a channel clock is T, one period of the wobble signal corresponds to 32 periods of the channel clock (32T).

Figure 3:
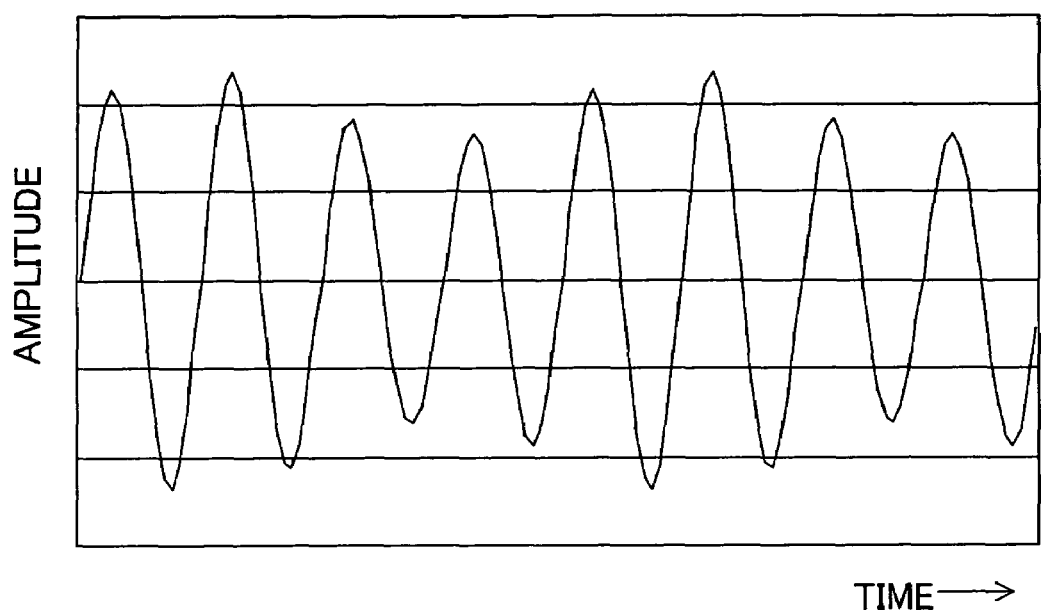
FIG. 3 is a waveform showing an example of variation in the amplitude of the input wobble signal in the address information demodulation circuit of FIG. 1.

FIG. 3 shows an example of variation in the amplitude of the input wobble signal in the address information demodulation circuit of FIG. 1. An input wobble signal varies in amplitude in many cases. This amplitude variation remains even after gain adjustment with a large time constant is performed in an analog circuit. In view of this, the digital AGC circuit 4 in FIG. 1 adjusts the gain so as to correct such amplitude variation in the wobble signal and keep the amplitude constant.

Figure 4:
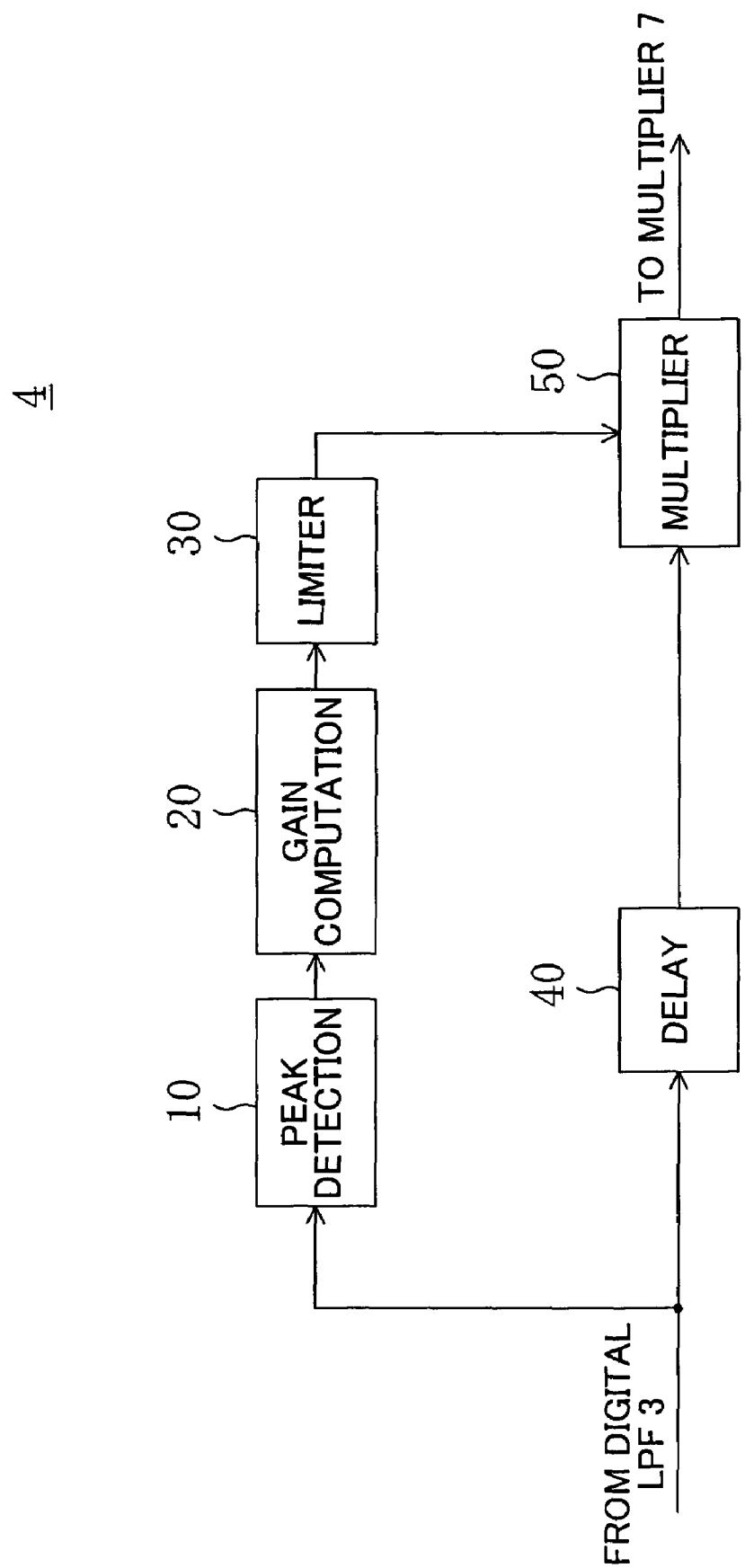
FIG. 4 is a block diagram of a first example of the digital AGC circuit of the present invention.

FIG. 4 shows a first example of the configuration of the digital AGC circuit 4 of the present invention. Referring to FIG. 4, the digital AGC circuit 4 includes a peak detection circuit 10, a gain computation circuit 20, a limiter 30, a delay circuit 40 and a multiplier 50. Since the amplitude of the wobble signal largely varies in a short time as shown in FIG. 3, the digital AGC circuit 4 adopts feedforward control.

The peak detection circuit 10 receives the wobble signal from the digital LPF 3 in FIG. 1 and detects a peak value in a time period equal to or more than a half period of the wobble signal. The detection of a peak value will not fail because either a positive or negative peak value of the wobble signal inevitably exists in this time period. The gain computation circuit 20 computes a gain adjustment coefficient from the peak value detected by the peak detection circuit 10, and supplies the gain adjustment coefficient to the multiplier 50. The limiter 30 limits the gain adjustment coefficient to be supplied to the multiplier 50 to within a fixed range. The delay circuit 40 delays the wobble signal received from the digital LPF 3 and outputs the delayed signal to the multiplier 50, for adjustment of digital-related delay generated when the gain adjustment coefficient is computed. The multiplier 50 multiplies the wobble signal supplied from the delay circuit 40 by the gain adjustment coefficient, and sends the result to the multiplier 7 in FIG. 1.

The gain adjustment coefficient output from the gain computation circuit 20 increases or decreases the amplitude of the wobble signal. If no gain adjustment is necessary, the gain adjustment coefficient is 1. An excessively large or small gain adjustment coefficient is undesirable for the gain adjustment. Therefore, the limiter 30 is placed following the gain computation circuit 20 for setting the upper and lower limits of the gain adjustment coefficient. With existence of the limiter 30, short-time sudden gain increase/decrease is prevented. The limiter 30 may be omitted.

The delay circuit 40 in FIG. 4 may also be omitted. The digital-related delay generated when the gain adjustment coefficient is computed is only about one to two periods. Some degree of gain control is therefore possible without the delay adjustment by the delay circuit 40. However, omitting the delay circuit 40 is undesirable when the gain largely changes in a short time.

Figure 5:
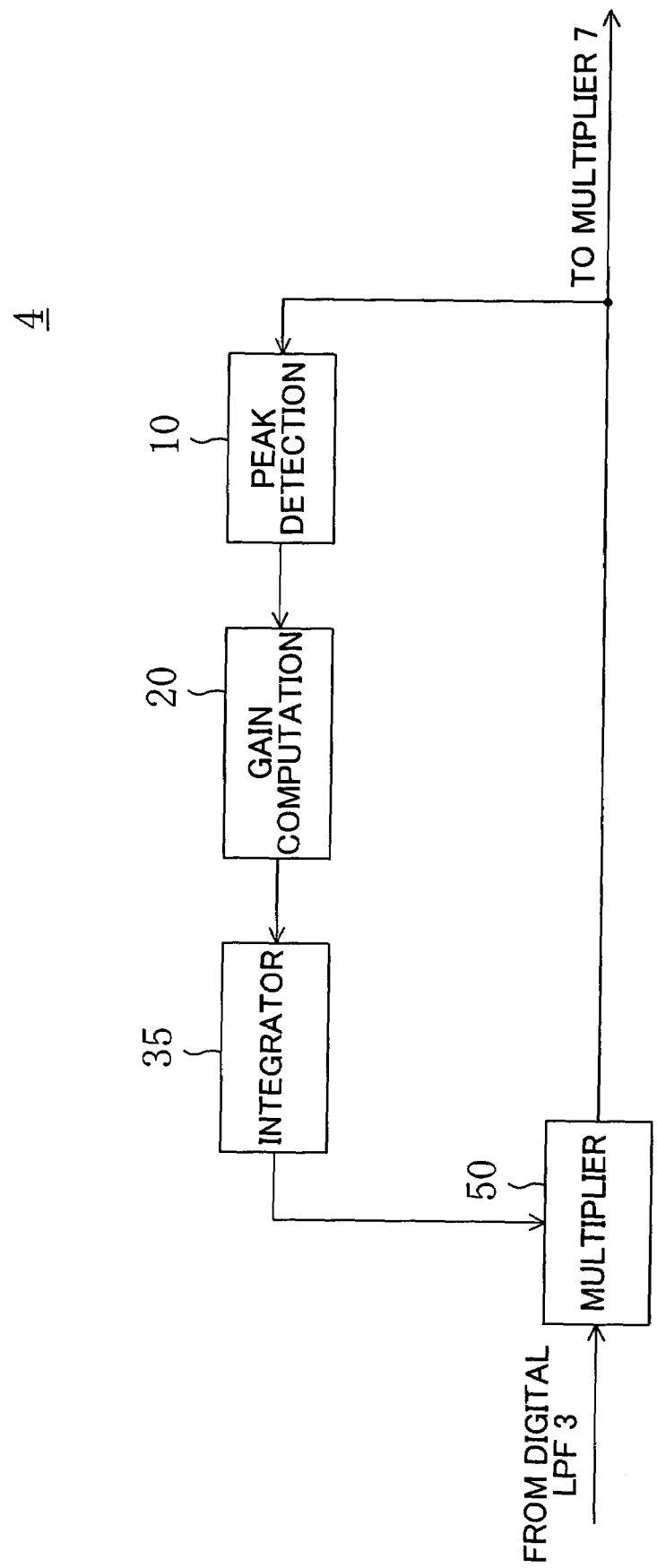
FIG. 5 is a block diagram of a second example of the digital AGC circuit of the present invention.

FIG. 5 shows a second example of the configuration of the digital AGC circuit 4 of the present invention. Referring to FIG. 5, the digital AGC circuit 4 includes a peak detection circuit 10 receiving the output of the digital AGC circuit 4, a gain computation circuit 20, an integrator 35 and a multiplier 50. The operations of the peak detection circuit 10 and the gain computation circuit 20 in FIG. 5 are the same as those described with reference to FIG. 4. The difference of this example from the example of FIG. 4 is that feedback control is adopted for the gain adjustment in this example. The multiplier 50 in FIG. 5 multiplies the wobble signal (output of the digital LPF 3) by a gain adjustment coefficient computed by the gain computation circuit 20 under feedback control. Use of feedback control delays the timing of the gain adjustment compared with the example of FIG. 4. However, this delay is only about one to two periods, which will not so largely affect the control of the gain adjustment.

In FIG. 5, the integrator 35 is placed following the gain computation circuit 20. By integrating the gain adjustment coefficient by the integrator 35, delicate gain control is possible. The integrator 35 may be omitted.

Figure 6:
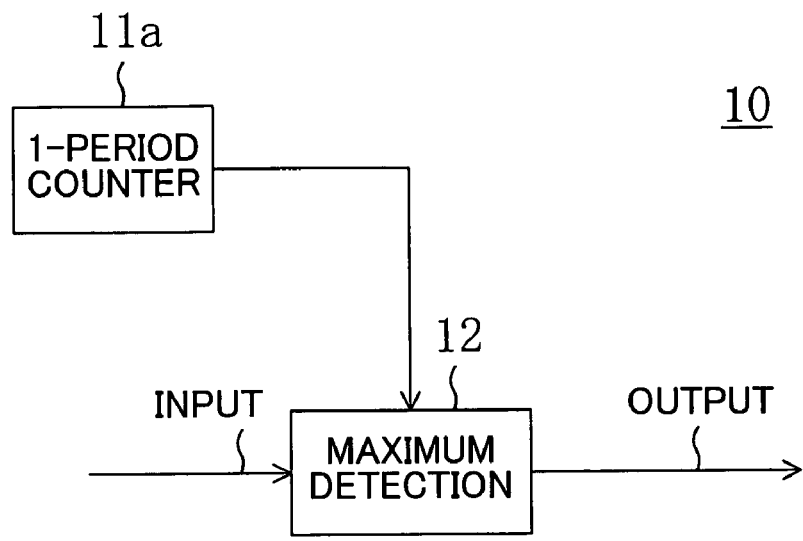
FIG. 6 is a block diagram of a first example of a peak detection circuit in FIGS. 4 and 5.

FIG. 6 shows a first example of the configuration of the peak detection circuit 10 in FIGS. 4 and 5. Referring to FIG. 6, the peak detection circuit 10 includes a one-period counter 11a and a maximum detection circuit 12. The one-period counter 11a counts 32 periods of a channel clock corresponding to one period of the wobble signal shown in FIG. 2. The wobble signal inevitably has a positive peak value and a negative peak value in the 32 periods of the clock. The maximum detection circuit 12 detects the positive peak value. Based on the output of the maximum detection circuit 12, the gain computation circuit 20 computes the gain adjustment coefficient.

Figure 7:
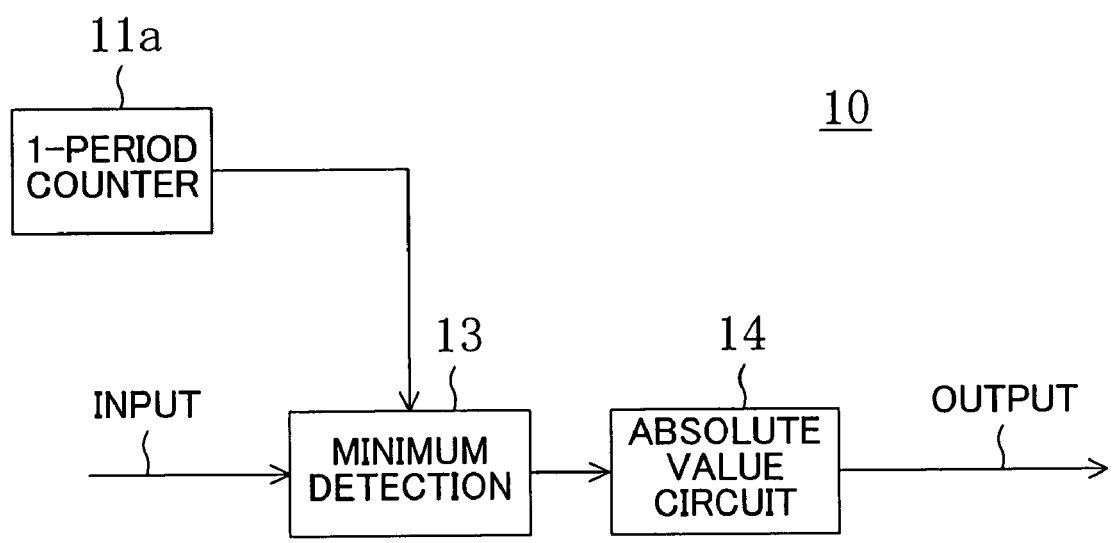
FIG. 7 is a block diagram of a second example of the peak detection circuit in FIGS. 4 and 5.

FIG. 7 shows a second example of the configuration of the peak detection circuit 10 in FIGS. 4 and 5. Referring to FIG. 7, the peak detection circuit 10 includes a one-period counter 11a, a minimum detection circuit 13 and an absolute value circuit 14. The minimum detection circuit 13 detects the negative peak value in one period of the wobble signal. The absolute value circuit 14 computes the absolute value of the output of the minimum detection circuit 13. Based on the output of the absolute value circuit 14, the gain computation circuit 20 computes the gain adjustment coefficient.

Figure 8:
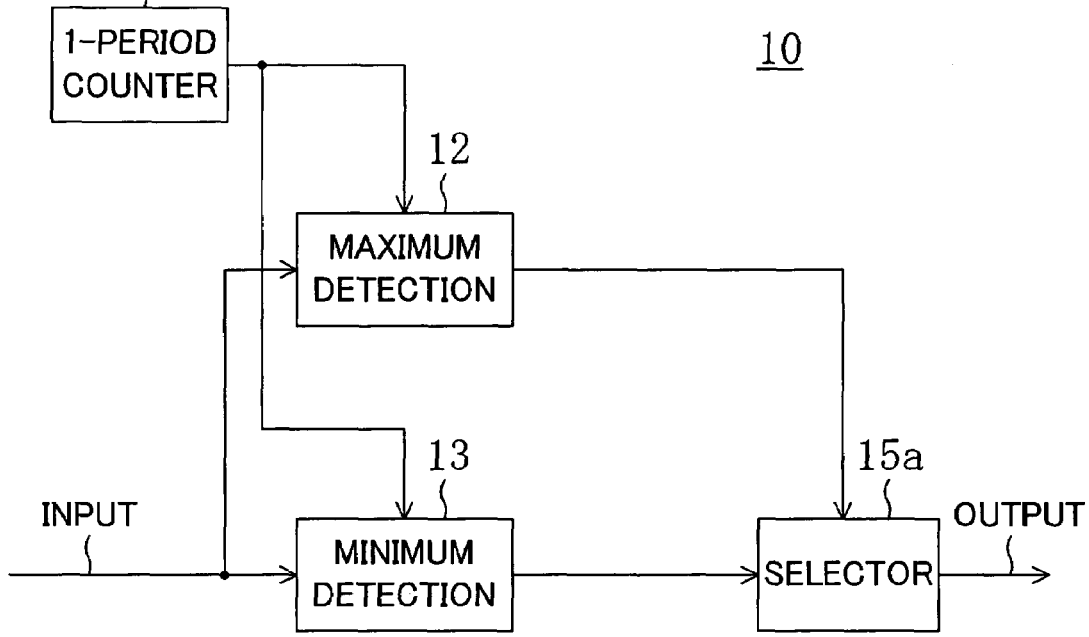
FIG. 8 is a block diagram of a third example of the peak detection circuit in FIGS. 4 and 5.

FIG. 8 shows a third example of the configuration of the peak detection circuit 10 in FIGS. 4 and 5. Referring to FIG. 8, the peak detection circuit 10 includes a one-period counter 11a, a maximum detection circuit 12, a minimum detection circuit 13 and a selector 15a. The maximum detection circuit 12 detects the positive peak value as the maximum value in 32 periods of a clock, and the minimum detection circuit 13 detects the negative peak value as the minimum value in the 32 periods of the clock. The selector 15a selects either one of the output of the maximum detection circuit 12 and the output of the minimum detection circuit 13, and outputs the selection result. For the gain adjustment, either one of the positive and negative peak values will suffice.

Figure 9:
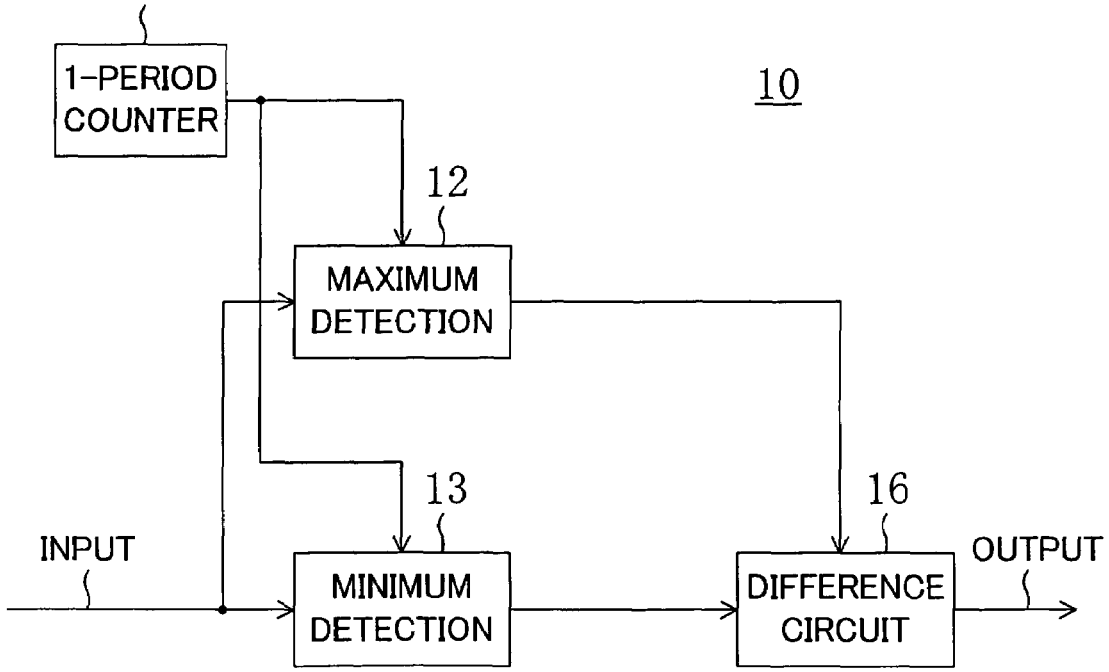
FIG. 9 is a block diagram of a fourth example of the peak detection circuit in FIGS. 4 and 5.

FIG. 9 shows a fourth example of the configuration of the peak detection circuit 10 in FIGS. 4 and 5. Referring to FIG. 9, the peak detection circuit 10 includes a one-period counter 11a, a maximum detection circuit 12, a minimum detection circuit 13 and a difference circuit 16. The operations of the maximum detection circuit 12 and the minimum detection circuit 13 are the same as those described above. The difference circuit 16 computes the difference between the output of the maximum detection circuit 12 and the output of the minimum detection circuit 13, and outputs the computation result. Since the output of the maximum detection circuit 12 is the positive peak value and the output of the minimum detection circuit 13 is the negative peak value, the output of the difference circuit 16 is equal to the peak-to-peak value of the wobble signal.

Figure 10:
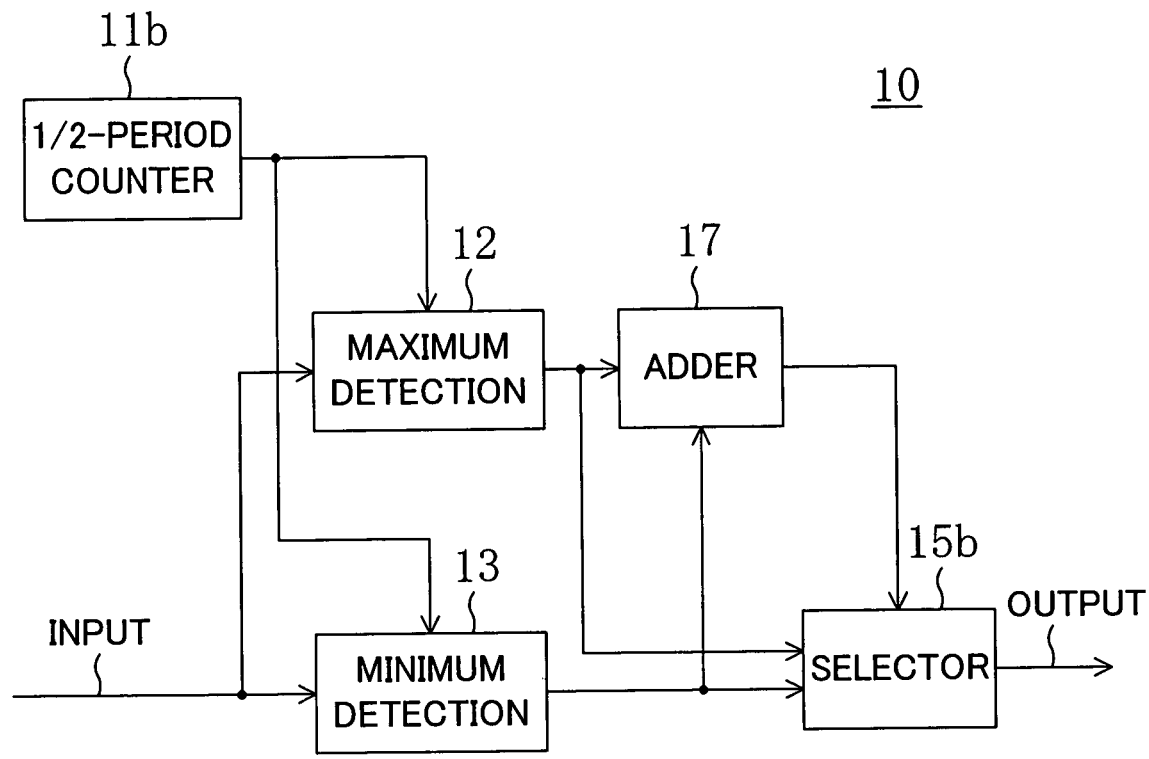
FIG. 10 is a block diagram of a fifth example of the peak detection circuit in FIGS. 4 and 5.

FIG. 10 shows a fifth example of the configuration of the peak detection circuit 10 in FIGS. 4 and 5. Referring to FIG. 10, the peak detection circuit 10 includes a half-period counter 11b, a maximum detection circuit 12, a minimum detection circuit 13, an adder 17 and a selector 15b. The wobble signal inevitably has a positive peak value and a negative peak value in the 32 periods of the clock as shown in FIG. 2. This indicates that either the positive or negative peak value exists in a half period of the wobble signal. Since either one of the positive and negative peak values suffices for the gain adjustment, the gain adjustment can also be performed using the half-period counter 11b.

In FIG. 10, the operations of the maximum detection circuit 12 and the minimum detection circuit 13 are the same as those described above. The adder 17 adds the output of the maximum detection circuit 12 and the output of the minimum detection circuit 13. The sign of the output of the adder 17 changes depending on which peak value is larger in absolute value, the positive peak value or the negative peak value. When the absolute value of the positive peak value is larger, the output has a positive sign, while when the absolute value of the negative peak value is larger, the output has a negative sign. The selector 15b is switched according to the sign of the output of the adder 17, to select the maximum detection circuit 12 or the minimum detection circuit 13 whichever outputs a larger absolute value. The gain adjustment coefficient is computed based on the output of the selector 15b.

Figure 11:
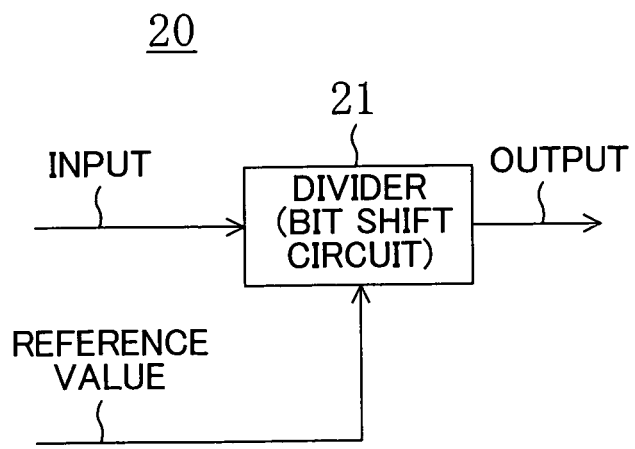
FIG. 11 is a block diagram of an example of a gain computation circuit in FIGS. 4 and 5.

FIG. 11 shows an example of the configuration of the gain computation circuit 20 in FIGS. 4 and 5. In FIG. 11, the gain computation circuit 20 includes a divider 21 for dividing a reference value by the output (peak value) of the preceding peak detection circuit 10. The division result is the gain adjustment coefficient.

The divider 21 in FIG. 11 may be composed of a bit shift circuit for bit shift division, in which a bit sequence of a digital signal is bit-shifted to obtain the same effect as that obtained in normal division. Using this bit shift division, the division precision decreases but the circuit scale can be reduced.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A digital AGC circuit used for an address information demodulation circuit for demodulating address information recorded on a DVD by phase modulation of a wobble signal, the digital AGC circuit comprising:
    a peak detection circuit for receiving a digitized wobble signal and detecting a peak value in a time period equal to or more than a half period of the wobble signal;
    a gain computation circuit for computing a gain adjustment coefficient from the detected peak value; and
    a multiplier for multiplying the digitized wobble signal by the gain adjustment coefficient.

2. The digital AGC circuit of claim 1, further comprising a delay circuit for delaying the wobble signal and supplying the delayed signal to the multiplier.

3. The digital AGC circuit of claim 1, further comprising a limiter for limiting the gain adjustment coefficient to be supplied from the gain computation circuit to the multiplier to within a fixed range.

4. The digital AGC circuit of claim 1, wherein the peak detection circuit comprises:
    a one-period counter for counting one period of the wobble signal; and
    a maximum detection circuit for detecting the maximum value in one period of the wobble signal as a positive peak value according to an output of the one-period counter and supplying the detected maximum value to the gain computation circuit.

5. The digital AGC circuit of claim 1, wherein the peak detection circuit comprises:
    a one-period counter for counting one period of the wobble signal;
    a minimum detection circuit for detecting the minimum value in one period of the wobble signal as a negative peak value according to an output of the one-period counter; and
    an absolute value circuit for computing the absolute value of the detected negative peak value and supplying the computed absolute value to the gain computation circuit.

6. The digital AGC circuit of claim 1, wherein the peak detection circuit comprises:
    a one-period counter for counting one period of the wobble signal;
    a maximum detection circuit for detecting the maximum value in one period of the wobble signal as a positive peak value according to an output of the one-period counter;
    a minimum detection circuit for detecting the minimum value in one period of the wobble signal as a negative peak value according to the output of the one-period counter; and
    a selector for selecting either the detected positive peak value or negative peak value and supplying the selected peak value to the gain computation circuit.

7. The digital AGC circuit of claim 1, wherein the peak detection circuit comprises:
    a one-period counter for counting one period of the wobble signal; and
    a maximum detection circuit for detecting the maximum value in one period of the wobble signal as a positive peak value according to an output of the one-period counter;
    a minimum detection circuit for detecting the minimum value in one period of the wobble signal as a negative peak value according to the output of the one-period counter; and
    a difference circuit for computing the difference between the detected positive peak value and negative peak value and supplying the computed difference to the gain computation circuit.

8. The digital AGC circuit of claim 1, wherein the peak detection circuit comprises:
    a half-period counter for counting a half period of the wobble signal; and
    a maximum detection circuit for detecting the maximum value in a half period of the wobble signal as a positive peak value according to an output of the half-period counter;
    a minimum detection circuit for detecting the minimum value in a half period of the wobble signal as a negative peak value according to the output of the half-period counter;
    an adder for adding the detected positive peak value and negative peak value; and
    a selector for selecting either the detected positive peak value or negative peak value according to an output of the adder and supplying the selected peak value to the gain computation circuit.

9. The digital AGC circuit of claim 1, wherein the gain computation circuit includes a divider for dividing a reference value by the peak value detected by the peak detection circuit.

10. The digital AGC circuit of claim 9, wherein the divider is constructed of a bit shift circuit for performing bit shift division.

11. A digital AGC circuit used for an address information demodulation circuit for demodulating address information recorded on a DVD by phase modulation of a wobble signal, the digital AGC circuit comprising:
- a peak detection circuit for receiving an output of the digital AGC circuit and detecting a peak value in a time period equal to or more than a half period of the input;
- a gain computation circuit for computing a gain adjustment coefficient from the detected peak value; and
- a multiplier for receiving a digitized wobble signal and multiplying the wobble signal by the gain adjustment coefficient.

12. The digital AGC circuit of claim 11, further comprising an integrator for integrating the gain adjustment coefficient received from the gain computation circuit and supplying the result to the multiplier.

13. The digital AGC circuit of claim 11, wherein the peak detection circuit comprises:
- a one-period counter for counting one period of the wobble signal; and
- a maximum detection circuit for detecting the maximum value in one period of the wobble signal as a positive peak value according to an output of the one-period counter and supplying the detected maximum value to the gain computation circuit.

14. The digital AGC circuit of claim 11, wherein the peak detection circuit comprises:
- a one-period counter for counting one period of the wobble signal;
- a minimum detection circuit for detecting the minimum value in one period of the wobble signal as a negative peak value according to an output of the one-period counter; and
- an absolute value circuit for computing an absolute value of the detected negative peak value and supplying the computed absolute value to the gain computation circuit.

15. The digital AGC circuit of claim 11, wherein the peak detection circuit comprises:
- a one-period counter for counting one period of the wobble signal; and
- a maximum detection circuit for detecting the maximum value in one period of the wobble signal as a positive peak value according to an output of the one-period counter;
- a minimum detection circuit for detecting the minimum value in one period of the wobble signal as a negative peak value according to an output of the one-period counter; and
- a selector for selecting either the detected positive peak value or negative peak value and supplying the selected peak value to the gain computation circuit.

16. The digital AGC circuit of claim 11, wherein the peak detection circuit comprises:
- a one-period counter for counting one period of the wobble signal; and
- a maximum detection circuit for detecting the maximum value in one period of the wobble signal as a positive peak value according to an output of the one-period counter;
- a minimum detection circuit for detecting the minimum value in one period of the wobble signal as a negative peak value according to an output of the one-period counter; and
- a difference circuit for computing the difference between the detected positive peak value and negative peak value and supplying the computed difference to the gain computation circuit.

17. The digital AGC circuit of claim 11, wherein the peak detection circuit comprises:
- a half-period counter for counting a half period of the wobble signal; and
- a maximum detection circuit for detecting the maximum value in a half period of the wobble signal as a positive peak value according to an output of the half-period counter;
- a minimum detection circuit for detecting the minimum value in a half period of the wobble signal as a negative peak value according to an output of the half-period counter;
- an adder for adding the detected positive peak value and negative peak value; and
- a selector for selecting either the detected positive peak value or negative peak value according to an output of the adder and supplying the selected peak value to the gain computation circuit.

18. The digital AGC circuit of claim 11, wherein the gain computation circuit includes a divider for dividing a reference value by the peak value detected by the peak detection circuit.

19. The digital AGC circuit of claim 18, wherein the divider is constructed of a bit shift circuit for performing bit shift division.

* * * * *